(12) United States Patent
Albrecht et al.

(10) Patent No.: US 10,326,133 B2
(45) Date of Patent: Jun. 18, 2019

(54) METHODS OF MAKING INORGANIC COMPOUNDS

(71) Applicant: TODA KOGYO CORP., Hiroshima-shi, Hiroshima-ken (JP)

(72) Inventors: Sven Albrecht, Goslar (DE); Michael Kruft, Rheinbrohl (DE); Stefan Malcus, Goslar (DE)

(73) Assignee: TODA KOGYO CORP., Hiroshima (JP)

( * ) Notice: Subject to any disclaimer, the term of this patent is extended or adjusted under 35 U.S.C. 154(b) by 0 days.

(21) Appl. No.: 15/267,167

(22) Filed: Sep. 16, 2016

(65) Prior Publication Data

US 2017/0033358 A1   Feb. 2, 2017

Related U.S. Application Data

(62) Division of application No. 11/990,273, filed as application No. PCT/EP2006/007816 on Aug. 8, 2006, now abandoned.

(30) Foreign Application Priority Data

Aug. 12, 2005   (DE) .................. 10 2005 038 158

(51) Int. Cl.
*H01M 4/525*   (2010.01)
*C01G 53/00*   (2006.01)
(Continued)

(52) U.S. Cl.
CPC .......... *H01M 4/525* (2013.01); *C01G 51/006* (2013.01); *C01G 53/006* (2013.01); *C01G 53/40* (2013.01);
(Continued)

(58) Field of Classification Search
CPC ... C01G 53/006; C01G 51/006; H01M 4/505; H01M 4/525; H01M 4/485;
(Continued)

(56) References Cited

U.S. PATENT DOCUMENTS 6,348,284 B1   2/2002   Bernard et al.
2002/0039683 A1   4/2002   Kihara et al.
(Continued)

FOREIGN PATENT DOCUMENTS

| JP | 2002-201028 | 7/2002 |
|---|---|---|
| WO | WO 2004/040677 | 5/2004 |
| WO | WO 2004/092073 | 10/2004 |

OTHER PUBLICATIONS

The references were cited by or submitted to the Office in U.S. Appl. No. 11/990,273 (filed Mar. 10, 2009), which is relied upon for an earlier filing date under 35 U.S.C. 120. Thus, Form PTO/SB/08 is attached without these refrences. 37 C.F.R. 1.98(d).
(Continued)

*Primary Examiner* — Richard M Rump
(74) *Attorney, Agent, or Firm* — Nixon & Vanderhye P.C.

(57) ABSTRACT

The invention relates to a chemical compound of the formula $Ni_bM1_cM2_d(O)_x(OH)_y$, wherein M1 denotes at least one element from the group consisting of Fe, Co, Mg, Zn, Cu and/or mixtures thereof, M2 denotes at least one element from the group consisting of Mn, Al, B, Ca, Cr and/or mixtures thereof, wherein $b \leq 0.8$, $c \leq 0.5$, $d \leq 0.5$, and x is a number between 0.1 and 0.8, y is a number between 1.2 and 1.9, and $x+y=2$. A process for the preparation thereof, and the use thereof as a precursor for the preparation of cathode material for secondary lithium batteries are described.

15 Claims, 5 Drawing Sheets

(51) Int. Cl.
  *H01M 4/485* (2010.01)
  *H01M 4/505* (2010.01)
  *C01G 51/00* (2006.01)
  *H01M 10/0525* (2010.01)
  *H01M 10/052* (2010.01)
  *H01M 4/02* (2006.01)

(52) U.S. Cl.
  CPC ............ *C01G 53/50* (2013.01); *H01M 4/485* (2013.01); *H01M 4/505* (2013.01); *H01M 10/0525* (2013.01); *C01P 2002/72* (2013.01); *C01P 2004/03* (2013.01); *C01P 2004/32* (2013.01); *C01P 2004/51* (2013.01); *C01P 2004/61* (2013.01); *C01P 2006/11* (2013.01); *C01P 2006/40* (2013.01); *H01M 10/052* (2013.01); *H01M 2004/028* (2013.01); *Y10T 428/2982* (2015.01)

(58) Field of Classification Search
  CPC ............ H01M 10/052; Y10T 428/2982; C01P 2004/03; C01P 2004/51; C01P 2002/72; C01P 2006/40
  See application file for complete search history.

(56) References Cited

U.S. PATENT DOCUMENTS

| | | |
|---|---|---|
| 2002/0053663 A1 | 5/2002 | Ito et al. |
| 2003/0186125 A1 | 10/2003 | Shimakawa et al. |
| 2003/0206852 A1 | 11/2003 | Yang et al. |
| 2004/0241545 A1 | 12/2004 | Ochiai et al. |
| 2005/0026039 A1 | 2/2005 | Ito et al. |
| 2006/0083989 A1 | 4/2006 | Suhara et al. |

OTHER PUBLICATIONS

International Search Report issued in PCT/EP2006/007816 dated Nov. 13, 2006.

METHODS OF MAKING INORGANIC COMPOUNDS

This application is a divisional of U.S. application Ser. No. 11/990,273 filed Mar. 10, 2009, which is the U.S. national phase of International Application No. PCT/EP2006/007816 filed Aug. 8, 2006, which claims priority to DE 102005038158.8 filed Aug. 12, 2005, the contents of each of which are incorporated herein by reference.

The present invention relates to a chemical compound of the formula $Ni_bM1_cM2_d(O)_x(OH)_y$, a process for the preparation thereof and the use thereof as a precursor for the preparation of cathode material for lithium secondary batteries.

Portable and cordless electrical equipment is widely used. Due to the ever more progressive miniaturization of this portable electronic equipment, the demand for ever smaller and more lightweight secondary batteries of high energy density, which serve as the energy source for such equipment, has risen at lightning speed in recent years. Lithium secondary batteries with non-aqueous electrolyte liquids have the desired properties.

This type of secondary batteries is distinguished by a positive electrode, the active material of which can reversibly embed and release lithium ions.

Composite oxides which in each case comprise lithium and at least one transition metal are known as suitable active substances for the positive electrodes of such secondary batteries. Examples are $LiCoO_2$, $LiNiO_2$ or also $LiNi_{0.8}Co_{0.2}O_2$. However, these material have various disadvantages. $LiCoO_2$, which is currently still used most frequently in lithium secondary batteries, has the disadvantage of a very high price of cobalt. Nickel is indeed less expensive than cobalt, but the high nickel-containing active masses have the disadvantage that when they are employed in secondary batteries they have the effect of an inadequate heat stability of the battery.

Among the materials mentioned, there was still no active substance for lithium secondary batteries for which the charging/discharging capacity, the resistance in the course of the electrochemical cycles, the thermal reliability and the cost aspect were simultaneously satisfactory.

JP 10-27611 proposes employing an at least bimetallic mixed hydroxide as a precursor for the synthesis of the lithium mixed metal oxide to improve the electrochemical properties. In addition to the elements nickel and cobalt, the elements aluminium and manganese, inter alia, are also mentioned in this context as a third metallic component for co-precipitation of the mixed metal hydroxide. It is recommended that the amount of doping elements (metallic components with the exception of nickel) is 10-30 mol % of the total amount of metal. At an amount of these metallic doping components of less than 10 mol %, a battery with this active mass has an inadequate cycle stability, while at an amount of greater than 30 mol %, the spherical particle shape is difficult to maintain in the precursor.

US 2002/0053663 A1 and US 2003/0059490 A1 propose composite oxides which comprise lithium, nickel, cobalt and manganese. In this context, co-precipitated mixed hydroxides of nickel, cobalt and manganese form the starting substance for the later mixed oxides. Both the electrochemical charging/discharging properties of the secondary battery and the high temperature stability are said to be improved by the doping elements cobalt and manganese in the lithium mixed metal oxide. In order to achieve these aims, higher concentrations of cobalt and manganese are required compared with the compounds mentioned in JP 10-27611. The upper limit mentioned for cobalt and manganese in US 2002/0053663 A1 is in each case 33 mol %, based on the total amount of the metallic transition elements.

According to US 2002/0053663 A1, to date it has been very difficult to prepare a suitable precursor for the mixed metal oxides. In particular, co-precipitation of a mixed metal hydroxide comprising the elements nickel, cobalt and manganese which would meet requirements in respect of the tap density of the powder has not been successful. In the case of the mixed metal oxides, it is very important that they are distinguished by a high tap density, because the high tap density leads to an increase in the volumetric energy density of the battery. In this context, the tap density of the co-precipitated mixed metal hydroxide has a direct influence on the later tap density of the lithium mixed metal oxide. In US 2002/0053663 A1, mixed hydroxides comprising nickel, cobalt and manganese and having a high tap density of 1.5 $g/cm^3$ or higher are successfully synthesized either by the precipitation process of the mixed hydroxides taking place in an inert gas atmosphere or by a reducing agent being present in the product suspension. It is assumed that by vigorous stirring during the precipitation reaction, a partial oxidation of the elements Co(II) and manganese(II) takes place by inclusion of air, which leads to a reduction in the tap density for the co-precipitated mixed hydroxide. In US 2002/0053663 A1, a high stirring speed is recommended, which leads to an abrasion mechanism between the particles. The interaction between abrasion and particle growth is said to be a guarantee for production of spherical particles. It is therefore obvious that the desired abrasion leads to a limitation of the average particle sizes of the secondary particles.

US 2003/0054251 A1 describes an optimized process route for the synthesis of nickel- and manganese-containing mixed oxides as an active mass for lithium secondary batteries. The main aim of this invention is to heat-treat the co-precipitated mixed hydroxides (e.g. comprising Ni, Co, Mn) at 300-500° C. before the actual oven process. i.e. before the conversion into the lithium mixed metal oxide, in order to obtain the so-called dry precursor. A lithium component is then added to this dry precursor and the mixture is converted into the mixed metal oxide by calcining. If the dried precursor described is employed instead of a non-dried mixed hydroxide, according to US 2003/0054251 A1 an end product is obtained which is distinguished by a higher consistency of the product than in the case of materials for which the non-dried mixed hydroxide is employed. The consistency of the product from the materials was determined by producing in each case twenty batteries with each material and evaluating the variation of the decrease in capacity between the third and three-hundredth electrochemical cycle for these twenty batteries.

However, the additional thermal step of "precursor drying" and the stated use of lithium hydroxide instead of the less expensive lithium carbonate make the process both complicated and expensive.

WO 2004/092073 A1 also relates to mixed metal precursors for the synthesis of lithium mixed metal oxide. As in US 2003/0054251 A1, an ideal precursor for the synthesis of this compound class is sought here. In this context, US 2003/0054251 A1 is mentioned, inter alia, as prior art. Since the heat treatment of the precursor, as described in US 2003/0054251, is very involved and the subsequent use of LiOH is very expensive compared with $Li_2CO_3$, an oxidation of the co-precipitated Ni—Co—Mn hydroxide to give an Ni—Co—Mn oxyhydroxide is proposed as an alternative here.

The oxidation is carried out using an oxidizing agent such as dissolved air, sodium hypochlorite, hydrogen peroxide solution, potassium peroxodisulfate or bromine.

In the examples given it is striking that a very involved process is likewise employed. After the co-precipitation of the nickel-cobalt-manganese hydroxide, a filtration is first carried out, and then a washing of the residue on the filter in order to obtain a purified mixed metal hydroxide. Thereafter, the metal hydroxide is suspended again in an aqueous solution which contains the oxidizing agent and is oxidized over a certain period of time at a particular temperature to give a nickel-cobalt-manganese oxyhydroxide. Thereafter, a filtration and a washing of the product obtained are again carried out.

It can be assumed that the first washing is carried out because during the subsequent oxidation of the mixed hydroxide there is the risk that in addition to a beta-NiOOH phase, a gamma-NiOOH phase also additionally forms. This phase has a significant expansion in volume compared with the beta-NiOOH phase because of an interlaminar expansion, which facilitates embedding of foreign ions, such as e.g. Na+ etc. The interlaminar expansion is already known from J. Power Sources, 8 (1982), 229. Only by a washing of the mixed hydroxide, as is proposed in WO 2004/092073A1, and subsequent suspending in an aqueous phase having a low concentration of foreign ions, can a significant incorporation of foreign ions into the crystal lattice structure be avoided. The foreign ions, such as $Na^+$, are not dissolved out of the crystal lattice structure again during further conversion of the mixed metal hydroxide into the lithium mixed metal oxide, and are thus an impurity in the end product. When incorporated into the later lithium layers, in particular, the $Na^+$ impurity can significantly impede diffusion of the lithium and therefore significantly impair the behaviour of the material in the battery.

Since the average valency of the metals in Example 1 of WO 2004/092073 A1 is stated as 2.97, and since it is known that $Mn^{2+}$ is considerably easier to oxidize than $Ni^{2+}$, it is to be assumed that the Mn has been partly oxidized to a valency of four and thus leads to the local formation of non-stoichiometric gamma-NiOOH.

US 2002/0053663 A1 discloses co-precipitated nickel-cobalt-manganese hydroxides, emphasis being placed on being able to synthesize a co-precipitated nickel-cobalt-manganese hydroxide having a high tap density. The hydroxide serves as a precursor for the lithium mixed metal oxides, which in turn is employed as an active mass in lithium secondary batteries. The tap density of the lithium mixed metal oxide is in turn of great importance and is influenced quite considerably by the tap density of the precursor. Alongside the tap density, however, further important parameters of the mixed hydroxide as a precursor for lithium mixed metal oxides are not dealt with.

US 2003/0054251 A1 explicitly points out that it is advantageous to use lithium hydroxide as the Li component, since the particle shape and the crystallinity can be controlled better with this Li component compared with lithium carbonate.

In WO 2004/092073 A1 the consequence is drawn from the above problems and the mixed hydroxide serving as a precursor in the prior art is oxidized to an oxyhydroxide before it is employed as a precursor for the synthesis of a lithium mixed metal oxide. In this context, however, a very involved synthesis route is taken, which according to the examples given comprises both two filtrations and two washings.

The object of the present invention is therefore to provide a mixed metal compound, as a precursor for the preparation of cathode material for lithium secondary batteries, which contains no gamma-oxyhydroxide structures and/or alpha-hydroxide structures, is distinguished by a high tap density, has low sodium contents and allows the synthesis of a high-quality lithium mixed metal compound. The object of the present invention is furthermore to provide a economical process for the preparation of partly oxidized mixed metal hydroxides.

The object is achieved by a chemical compound of the formula $Ni_b M1_c M2_d(O)_x(OH)_y$,
wherein
M1 denotes at least one element from the group consisting of Fe, Co, Mg, Zn, Cu and mixtures thereof,
M2 denotes at least one element from the group consisting of Mn, Al, B, Ca, Cr and mixtures thereof,
$b \leq 0.8$
$c \leq 0.5$
$d \leq 0.5$, and
x is a number between 0.1 and 0.8,
y is a number between 1.2 and 1.9, and $x+y=2$.

Advantageous compounds are chemical compounds of the formula $Ni_b M1_c M2_d(O)_x(OH)_y$, wherein
$0.3 \leq b \leq 0.6$
$0.1 \leq c \leq 0.4$
$0.1 \leq d \leq 0.4$ and/or x is a number between 0.2 and 0.7 and y is a number between 1.3 and 1.8 and $x+y=2$. The sum of b, c and d is preferably 1.

Particularly preferred compounds are chemical compounds of the formula $Ni_b M1_c M2_d(O)_x(OH)_y$, wherein x is a number between 0.3 and 0.6 and y is a number between 1.4 and 1.7.

Compounds which are part of the invention are listed in the following Tables 1 to 17. Individual compounds are designated by the number of the table, followed by the number of the combination of the variables M1, M2, b and c as in Table 1. For example, compound 14.022 is the compound as described in Table 14, wherein the variable x defined there is combined with the combination of variables M1, M2, b and c as in Table 1, position no. 022. In Tables 1 to 17, the compounds have the general formula $Ni_bM1_cM2_d(O)_x(OH)_y$, where $y=2-x$ and $d=1-b-c$.

TABLE 1

| No. | M1 | M2 | b | c |
|-----|----|----|-----|------|
| 001 | Co | Mn | 0.333 | 0.05 |
| 002 | Co | Mn | 0.375 | 0.05 |
| 003 | Co | Mn | 0.475 | 0.05 |
| 004 | Co | Mn | 0.5 | 0.05 |
| 005 | Co | Mn | 0.55 | 0.05 |
| 006 | Co | Mn | 0.65 | 0.05 |
| 007 | Co | Mn | 0.7 | 0.05 |
| 008 | Co | Mn | 0.75 | 0.05 |
| 009 | Co | Mn | 0.77 | 0.05 |
| 010 | Co | Mn | 0.333 | 0.13 |
| 011 | Co | Mn | 0.375 | 0.13 |
| 012 | Co | Mn | 0.475 | 0.13 |
| 013 | Co | Mn | 0.5 | 0.13 |
| 014 | Co | Mn | 0.55 | 0.13 |
| 015 | Co | Mn | 0.65 | 0.13 |
| 016 | Co | Mn | 0.7 | 0.13 |
| 017 | Co | Mn | 0.75 | 0.13 |
| 018 | Co | Mn | 0.77 | 0.13 |
| 019 | Co | Mn | 0.333 | 0.15 |
| 020 | Co | Mn | 0.375 | 0.15 |
| 021 | Co | Mn | 0.475 | 0.15 |
| 022 | Co | Mn | 0.5 | 0.15 |
| 023 | Co | Mn | 0.55 | 0.15 |
| 024 | Co | Mn | 0.65 | 0.15 |
| 025 | Co | Mn | 0.7 | 0.15 |
| 026 | Co | Mn | 0.75 | 0.15 |
| 027 | Co | Mn | 0.77 | 0.15 |
| 028 | Co | Mn | 0.333 | 0.20 |
| 029 | Co | Mn | 0.375 | 0.20 |
| 030 | Co | Mn | 0.475 | 0.20 |
| 031 | Co | Mn | 0.5 | 0.20 |
| 032 | Co | Mn | 0.55 | 0.20 |
| 033 | Co | Mn | 0.65 | 0.20 |
| 034 | Co | Mn | 0.7 | 0.20 |
| 035 | Co | Mn | 0.75 | 0.20 |
| 036 | Co | Mn | 0.77 | 0.20 |
| 037 | Co | Mn | 0.333 | 0.25 |
| 038 | Co | Mn | 0.375 | 0.25 |
| 039 | Co | Mn | 0.475 | 0.25 |
| 040 | Co | Mn | 0.5 | 0.25 |
| 041 | Co | Mn | 0.55 | 0.25 |
| 042 | Co | Mn | 0.65 | 0.25 |
| 043 | Co | Mn | 0.7 | 0.25 |
| 044 | Co | Mn | 0.75 | 0.25 |
| 045 | Co | Mn | 0.77 | 0.23 |
| 046 | Co | Mn | 0.333 | 0.333 |
| 047 | Co | Mn | 0.375 | 0.333 |
| 048 | Co | Mn | 0.475 | 0.333 |
| 049 | Co | Mn | 0.5 | 0.333 |
| 050 | Co | Mn | 0.55 | 0.333 |
| 051 | Co | Mn | 0.65 | 0.333 |
| 052 | Co | Mn | 0.7 | 0.10 |
| 053 | Co | Mn | 0.75 | 0.10 |
| 054 | Co | Mn | 0.77 | 0.10 |
| 055 | Co | Cr | 0.333 | 0.05 |
| 056 | Co | Cr | 0.375 | 0.05 |
| 057 | Co | Cr | 0.475 | 0.05 |
| 058 | Co | Cr | 0.5 | 0.05 |
| 059 | Co | Cr | 0.55 | 0.05 |
| 060 | Co | Cr | 0.65 | 0.05 |
| 061 | Co | Cr | 0.7 | 0.05 |
| 062 | Co | Cr | 0.75 | 0.05 |
| 063 | Co | Cr | 0.77 | 0.05 |
| 064 | Co | Cr | 0.333 | 0.13 |
| 065 | Co | Cr | 0.375 | 0.13 |
| 066 | Co | Cr | 0.475 | 0.13 |
| 067 | Co | Cr | 0.5 | 0.13 |
| 068 | Co | Cr | 0.55 | 0.13 |
| 069 | Co | Cr | 0.65 | 0.13 |

TABLE 1-continued

| No. | M1 | M2 | b | c |
|-----|----|----|-----|------|
| 070 | Co | Cr | 0.7 | 0.13 |
| 071 | Co | Cr | 0.75 | 0.13 |
| 072 | Co | Cr | 0.77 | 0.13 |
| 073 | Co | Cr | 0.333 | 0.15 |
| 074 | Co | Cr | 0.375 | 0.15 |
| 075 | Co | Cr | 0.475 | 0.15 |
| 076 | Co | Cr | 0.5 | 0.15 |
| 077 | Co | Cr | 0.55 | 0.15 |
| 078 | Co | Cr | 0.65 | 0.15 |
| 079 | Co | Cr | 0.7 | 0.15 |
| 080 | Co | Cr | 0.75 | 0.15 |
| 081 | Co | Cr | 0.77 | 0.15 |
| 082 | Co | Cr | 0.333 | 0.20 |
| 083 | Co | Cr | 0.375 | 0.20 |
| 084 | Co | Cr | 0.475 | 0.20 |
| 085 | Co | Cr | 0.5 | 0.20 |
| 086 | Co | Cr | 0.55 | 0.20 |
| 087 | Co | Cr | 0.65 | 0.20 |
| 088 | Co | Cr | 0.7 | 0.20 |
| 089 | Co | Cr | 0.75 | 0.20 |
| 090 | Co | Cr | 0.77 | 0.20 |
| 091 | Co | Cr | 0.333 | 0.25 |
| 092 | Co | Cr | 0.375 | 0.25 |
| 093 | Co | Cr | 0.475 | 0.25 |
| 094 | Co | Cr | 0.5 | 0.25 |
| 095 | Co | Cr | 0.55 | 0.25 |
| 096 | Co | Cr | 0.65 | 0.25 |
| 097 | Co | Cr | 0.7 | 0.25 |
| 098 | Co | Cr | 0.75 | 0.25 |
| 099 | Co | Cr | 0.77 | 0.23 |
| 100 | Co | Cr | 0.333 | 0.333 |
| 101 | Co | Cr | 0.375 | 0.333 |
| 102 | Co | Cr | 0.475 | 0.333 |
| 103 | Co | Cr | 0.5 | 0.333 |
| 104 | Co | Cr | 0.55 | 0.333 |
| 105 | Co | Cr | 0.65 | 0.333 |
| 106 | Co | Cr | 0.7 | 0.10 |
| 107 | Co | Cr | 0.75 | 0.10 |
| 108 | Co | Cr | 0.77 | 0.10 |
| 109 | Mg | Mn | 0.333 | 0.05 |
| 110 | Mg | Mn | 0.375 | 0.05 |
| 111 | Mg | Mn | 0.475 | 0.05 |
| 112 | Mg | Mn | 0.5 | 0.05 |
| 113 | Mg | Mn | 0.55 | 0.05 |
| 114 | Mg | Mn | 0.65 | 0.05 |
| 115 | Mg | Mn | 0.7 | 0.05 |
| 116 | Mg | Mn | 0.75 | 0.05 |
| 117 | Mg | Mn | 0.77 | 0.05 |
| 118 | Mg | Mn | 0.333 | 0.13 |
| 119 | Mg | Mn | 0.375 | 0.13 |
| 120 | Mg | Mn | 0.475 | 0.13 |
| 121 | Mg | Mn | 0.5 | 0.13 |
| 122 | Mg | Mn | 0.55 | 0.13 |
| 123 | Mg | Mn | 0.65 | 0.13 |
| 124 | Mg | Mn | 0.7 | 0.13 |
| 125 | Mg | Mn | 0.75 | 0.13 |
| 126 | Mg | Mn | 0.77 | 0.13 |
| 127 | Mg | Mn | 0.333 | 0.15 |
| 128 | Mg | Mn | 0.375 | 0.15 |
| 129 | Mg | Mn | 0.475 | 0.15 |
| 130 | Mg | Mn | 0.5 | 0.15 |
| 131 | Mg | Mn | 0.55 | 0.15 |
| 132 | Mg | Mn | 0.65 | 0.15 |
| 133 | Mg | Mn | 0.7 | 0.15 |
| 134 | Mg | Mn | 0.75 | 0.15 |
| 135 | Mg | Mn | 0.77 | 0.15 |
| 136 | Mg | Mn | 0.333 | 0.20 |
| 137 | Mg | Mn | 0.375 | 0.20 |
| 138 | Mg | Mn | 0.475 | 0.20 |
| 139 | Mg | Mn | 0.5 | 0.20 |
| 140 | Mg | Mn | 0.55 | 0.20 |
| 141 | Mg | Mn | 0.65 | 0.20 |
| 142 | Mg | Mn | 0.7 | 0.20 |
| 143 | Mg | Mn | 0.75 | 0.20 |
| 144 | Mg | Mn | 0.77 | 0.20 |
| 145 | Mg | Mn | 0.333 | 0.25 |
| 146 | Mg | Mn | 0.375 | 0.25 |
| 147 | Mg | Mn | 0.475 | 0.25 |

TABLE 1-continued

| No. | M1 | M2 | b | c |
|---|---|---|---|---|
| 148 | Mg | Mn | 0.5 | 0.25 |
| 149 | Mg | Mn | 0.55 | 0.25 |
| 150 | Mg | Mn | 0.65 | 0.25 |
| 151 | Mg | Mn | 0.7 | 0.25 |
| 152 | Mg | Mn | 0.75 | 0.25 |
| 153 | Mg | Mn | 0.77 | 0.23 |
| 154 | Mg | Mn | 0.333 | 0.333 |
| 155 | Mg | Mn | 0.375 | 0.333 |
| 156 | Mg | Mn | 0.475 | 0.333 |
| 157 | Mg | Mn | 0.5 | 0.333 |
| 158 | Mg | Mn | 0.55 | 0.333 |
| 159 | Mg | Mn | 0.65 | 0.333 |
| 160 | Mg | Mn | 0.7 | 0.10 |
| 161 | Mg | Mn | 0.75 | 0.10 |
| 162 | Mg | Mn | 0.77 | 0.10 |
| 163 | Mg | Cr | 0.333 | 0.05 |
| 164 | Mg | Cr | 0.375 | 0.05 |
| 165 | Mg | Cr | 0.475 | 0.05 |
| 166 | Mg | Cr | 0.5 | 0.05 |
| 167 | Mg | Cr | 0.55 | 0.05 |
| 168 | Mg | Cr | 0.65 | 0.05 |
| 169 | Mg | Cr | 0.7 | 0.05 |
| 170 | Mg | Cr | 0.75 | 0.05 |
| 171 | Mg | Cr | 0.77 | 0.05 |
| 172 | Mg | Cr | 0.333 | 0.13 |
| 173 | Mg | Cr | 0.375 | 0.13 |
| 174 | Mg | Cr | 0.475 | 0.13 |
| 175 | Mg | Cr | 0.5 | 0.13 |
| 176 | Mg | Cr | 0.55 | 0.13 |
| 177 | Mg | Cr | 0.65 | 0.13 |
| 178 | Mg | Cr | 0.7 | 0.13 |
| 179 | Mg | Cr | 0.75 | 0.13 |
| 180 | Mg | Cr | 0.77 | 0.13 |
| 181 | Mg | Cr | 0.333 | 0.15 |
| 182 | Mg | Cr | 0.375 | 0.15 |
| 183 | Mg | Cr | 0.475 | 0.15 |
| 184 | Mg | Cr | 0.5 | 0.15 |
| 185 | Mg | Cr | 0.55 | 0.15 |
| 186 | Mg | Cr | 0.65 | 0.15 |
| 187 | Mg | Cr | 0.7 | 0.15 |
| 188 | Mg | Cr | 0.75 | 0.15 |
| 189 | Mg | Cr | 0.77 | 0.15 |
| 190 | Mg | Cr | 0.333 | 0.20 |
| 191 | Mg | Cr | 0.375 | 0.20 |
| 192 | Mg | Cr | 0.475 | 0.20 |
| 193 | Mg | Cr | 0.5 | 0.20 |
| 194 | Mg | Cr | 0.55 | 0.20 |
| 195 | Mg | Cr | 0.65 | 0.20 |
| 196 | Mg | Cr | 0.7 | 0.20 |
| 197 | Mg | Cr | 0.75 | 0.20 |
| 198 | Mg | Cr | 0.77 | 0.20 |
| 199 | Mg | Cr | 0.333 | 0.25 |
| 200 | Mg | Cr | 0.375 | 0.25 |
| 201 | Mg | Cr | 0.475 | 0.25 |
| 202 | Mg | Cr | 0.5 | 0.25 |
| 203 | Mg | Cr | 0.55 | 0.25 |
| 204 | Mg | Cr | 0.65 | 0.25 |
| 205 | Mg | Cr | 0.7 | 0.25 |
| 206 | Mg | Cr | 0.75 | 0.25 |
| 207 | Mg | Cr | 0.77 | 0.23 |
| 208 | Mg | Cr | 0.333 | 0.333 |
| 209 | Mg | Cr | 0.375 | 0.333 |
| 210 | Mg | Cr | 0.475 | 0.333 |
| 211 | Mg | Cr | 0.5 | 0.333 |
| 212 | Mg | Cr | 0.55 | 0.333 |
| 213 | Mg | Cr | 0.65 | 0.333 |
| 214 | Mg | Cr | 0.7 | 0.10 |
| 215 | Mg | Cr | 0.75 | 0.10 |
| 216 | Mg | Cr | 0.77 | 0.10 |
| 217 | Zn | Mn | 0.333 | 0.05 |
| 218 | Zn | Mn | 0.375 | 0.05 |
| 219 | Zn | Mn | 0.475 | 0.05 |
| 220 | Zn | Mn | 0.5 | 0.05 |
| 221 | Zn | Mn | 0.55 | 0.05 |
| 222 | Zn | Mn | 0.65 | 0.05 |
| 223 | Zn | Mn | 0.7 | 0.05 |
| 224 | Zn | Mn | 0.75 | 0.05 |
| 225 | Zn | Mn | 0.77 | 0.05 |
| 226 | Zn | Mn | 0.333 | 0.13 |
| 227 | Zn | Mn | 0.375 | 0.13 |
| 228 | Zn | Mn | 0.475 | 0.13 |
| 229 | Zn | Mn | 0.5 | 0.13 |
| 230 | Zn | Mn | 0.55 | 0.13 |
| 231 | Zn | Mn | 0.65 | 0.13 |
| 232 | Zn | Mn | 0.7 | 0.13 |
| 233 | Zn | Mn | 0.75 | 0.13 |
| 234 | Zn | Mn | 0.77 | 0.13 |
| 235 | Zn | Mn | 0.333 | 0.15 |
| 236 | Zn | Mn | 0.375 | 0.15 |
| 237 | Zn | Mn | 0.475 | 0.15 |
| 238 | Zn | Mn | 0.5 | 0.15 |
| 239 | Zn | Mn | 0.55 | 0.15 |
| 240 | Zn | Mn | 0.65 | 0.15 |
| 241 | Zn | Mn | 0.7 | 0.15 |
| 242 | Zn | Mn | 0.75 | 0.15 |
| 243 | Zn | Mn | 0.77 | 0.15 |
| 244 | Zn | Mn | 0.333 | 0.20 |
| 245 | Zn | Mn | 0.375 | 0.20 |
| 246 | Zn | Mn | 0.475 | 0.20 |
| 247 | Zn | Mn | 0.5 | 0.20 |
| 248 | Zn | Mn | 0.55 | 0.20 |
| 249 | Zn | Mn | 0.65 | 0.20 |
| 250 | Zn | Mn | 0.7 | 0.20 |
| 251 | Zn | Mn | 0.75 | 0.20 |
| 252 | Zn | Mn | 0.77 | 0.20 |
| 253 | Zn | Mn | 0.333 | 0.25 |
| 254 | Zn | Mn | 0.375 | 0.25 |
| 255 | Zn | Mn | 0.475 | 0.25 |
| 256 | Zn | Mn | 0.5 | 0.25 |
| 257 | Zn | Mn | 0.55 | 0.25 |
| 258 | Zn | Mn | 0.65 | 0.25 |
| 259 | Zn | Mn | 0.7 | 0.25 |
| 260 | Zn | Mn | 0.75 | 0.25 |
| 261 | Zn | Mn | 0.77 | 0.23 |
| 262 | Zn | Mn | 0.333 | 0.333 |
| 263 | Zn | Mn | 0.375 | 0.333 |
| 264 | Zn | Mn | 0.475 | 0.333 |
| 265 | Zn | Mn | 0.5 | 0.333 |
| 266 | Zn | Mn | 0.55 | 0.333 |
| 267 | Zn | Mn | 0.65 | 0.333 |
| 268 | Zn | Mn | 0.7 | 0.10 |
| 269 | Zn | Mn | 0.75 | 0.10 |
| 270 | Zn | Mn | 0.77 | 0.10 |
| 271 | Zn | Cr | 0.333 | 0.05 |
| 272 | Zn | Cr | 0.375 | 0.05 |
| 273 | Zn | Cr | 0.475 | 0.05 |
| 274 | Zn | Cr | 0.5 | 0.05 |
| 275 | Zn | Cr | 0.55 | 0.05 |
| 276 | Zn | Cr | 0.65 | 0.05 |
| 277 | Zn | Cr | 0.7 | 0.05 |
| 278 | Zn | Cr | 0.75 | 0.05 |
| 279 | Zn | Cr | 0.77 | 0.05 |
| 280 | Zn | Cr | 0.333 | 0.13 |
| 281 | Zn | Cr | 0.375 | 0.13 |
| 282 | Zn | Cr | 0.475 | 0.13 |
| 283 | Zn | Cr | 0.5 | 0.13 |
| 284 | Zn | Cr | 0.55 | 0.13 |
| 285 | Zn | Cr | 0.65 | 0.13 |
| 286 | Zn | Cr | 0.7 | 0.13 |
| 287 | Zn | Cr | 0.75 | 0.13 |
| 288 | Zn | Cr | 0.77 | 0.13 |
| 289 | Zn | Cr | 0.333 | 0.15 |
| 290 | Zn | Cr | 0.375 | 0.15 |
| 291 | Zn | Cr | 0.475 | 0.15 |
| 292 | Zn | Cr | 0.5 | 0.15 |
| 293 | Zn | Cr | 0.55 | 0.15 |
| 294 | Zn | Cr | 0.65 | 0.15 |
| 295 | Zn | Cr | 0.7 | 0.15 |
| 296 | Zn | Cr | 0.75 | 0.15 |
| 297 | Zn | Cr | 0.77 | 0.15 |
| 298 | Zn | Cr | 0.333 | 0.20 |
| 299 | Zn | Cr | 0.375 | 0.20 |
| 300 | Zn | Cr | 0.475 | 0.20 |
| 301 | Zn | Cr | 0.5 | 0.20 |
| 302 | Zn | Cr | 0.55 | 0.20 |
| 303 | Zn | Cr | 0.65 | 0.20 |

TABLE 1-continued

| No. | M1 | M2 | b | c |
|---|---|---|---|---|
| 304 | Zn | Cr | 0.7 | 0.20 |
| 305 | Zn | Cr | 0.75 | 0.20 |
| 306 | Zn | Cr | 0.77 | 0.20 |
| 307 | Zn | Cr | 0.333 | 0.25 |
| 308 | Zn | Cr | 0.375 | 0.25 |
| 309 | Zn | Cr | 0.475 | 0.25 |
| 310 | Zn | Cr | 0.5 | 0.25 |
| 311 | Zn | Cr | 0.55 | 0.25 |
| 312 | Zn | Cr | 0.65 | 0.25 |
| 313 | Zn | Cr | 0.7 | 0.25 |
| 314 | Zn | Cr | 0.75 | 0.25 |
| 315 | Zn | Cr | 0.77 | 0.23 |
| 316 | Zn | Cr | 0.333 | 0.333 |
| 317 | Zn | Cr | 0.375 | 0.333 |
| 318 | Zn | Cr | 0.475 | 0.333 |
| 319 | Zn | Cr | 0.5 | 0.333 |
| 320 | Zn | Cr | 0.55 | 0.333 |
| 321 | Zn | Cr | 0.65 | 0.333 |
| 322 | Zn | Cr | 0.7 | 0.10 |
| 323 | Zn | Cr | 0.75 | 0.10 |
| 324 | Zn | Cr | 0.77 | 0.10 |
| 325 | Cu | Mn | 0.333 | 0.05 |
| 326 | Cu | Mn | 0.375 | 0.05 |
| 327 | Cu | Mn | 0.475 | 0.05 |
| 328 | Cu | Mn | 0.5 | 0.05 |
| 329 | Cu | Mn | 0.55 | 0.05 |
| 330 | Cu | Mn | 0.65 | 0.05 |
| 331 | Cu | Mn | 0.7 | 0.05 |
| 332 | Cu | Mn | 0.75 | 0.05 |
| 333 | Cu | Mn | 0.77 | 0.05 |
| 334 | Cu | Mn | 0.333 | 0.13 |
| 335 | Cu | Mn | 0.375 | 0.13 |
| 336 | Cu | Mn | 0.475 | 0.13 |
| 337 | Cu | Mn | 0.5 | 0.13 |
| 338 | Cu | Mn | 0.55 | 0.13 |
| 339 | Cu | Mn | 0.65 | 0.13 |
| 340 | Cu | Mn | 0.7 | 0.13 |
| 341 | Cu | Mn | 0.75 | 0.13 |
| 342 | Cu | Mn | 0.77 | 0.13 |
| 343 | Cu | Mn | 0.333 | 0.15 |
| 344 | Cu | Mn | 0.375 | 0.15 |
| 345 | Cu | Mn | 0.475 | 0.15 |
| 346 | Cu | Mn | 0.5 | 0.15 |
| 347 | Cu | Mn | 0.55 | 0.15 |
| 348 | Cu | Mn | 0.65 | 0.15 |
| 349 | Cu | Mn | 0.7 | 0.15 |
| 350 | Cu | Mn | 0.75 | 0.15 |
| 351 | Cu | Mn | 0.77 | 0.15 |
| 352 | Cu | Mn | 0.333 | 0.20 |
| 353 | Cu | Mn | 0.375 | 0.20 |
| 354 | Cu | Mn | 0.475 | 0.20 |
| 355 | Cu | Mn | 0.5 | 0.20 |
| 356 | Cu | Mn | 0.55 | 0.20 |
| 357 | Cu | Mn | 0.65 | 0.20 |
| 358 | Cu | Mn | 0.7 | 0.20 |
| 359 | Cu | Mn | 0.75 | 0.20 |
| 360 | Cu | Mn | 0.77 | 0.20 |
| 361 | Cu | Mn | 0.333 | 0.25 |
| 362 | Cu | Mn | 0.375 | 0.25 |
| 363 | Cu | Mn | 0.475 | 0.25 |
| 364 | Cu | Mn | 0.5 | 0.25 |
| 365 | Cu | Mn | 0.55 | 0.25 |
| 366 | Cu | Mn | 0.65 | 0.25 |
| 367 | Cu | Mn | 0.7 | 0.25 |
| 368 | Cu | Mn | 0.75 | 0.25 |
| 369 | Cu | Mn | 0.77 | 0.23 |
| 370 | Cu | Mn | 0.333 | 0.333 |
| 371 | Cu | Mn | 0.375 | 0.333 |
| 372 | Cu | Mn | 0.475 | 0.333 |
| 373 | Cu | Mn | 0.5 | 0.333 |
| 374 | Cu | Mn | 0.55 | 0.333 |
| 375 | Cu | Mn | 0.65 | 0.333 |
| 376 | Cu | Mn | 0.7 | 0.10 |
| 377 | Cu | Mn | 0.75 | 0.10 |
| 378 | Cu | Mn | 0.77 | 0.10 |
| 379 | Cu | Cr | 0.333 | 0.05 |
| 380 | Cu | Cr | 0.375 | 0.05 |
| 381 | Cu | Cr | 0.475 | 0.05 |
| 382 | Cu | Cr | 0.5 | 0.05 |
| 383 | Cu | Cr | 0.55 | 0.05 |
| 384 | Cu | Cr | 0.65 | 0.05 |
| 385 | Cu | Cr | 0.7 | 0.05 |
| 386 | Cu | Cr | 0.75 | 0.05 |
| 387 | Cu | Cr | 0.77 | 0.05 |
| 388 | Cu | Cr | 0.333 | 0.13 |
| 389 | Cu | Cr | 0.375 | 0.13 |
| 390 | Cu | Cr | 0.475 | 0.13 |
| 391 | Cu | Cr | 0.5 | 0.13 |
| 392 | Cu | Cr | 0.55 | 0.13 |
| 393 | Cu | Cr | 0.65 | 0.13 |
| 394 | Cu | Cr | 0.7 | 0.13 |
| 395 | Cu | Cr | 0.75 | 0.13 |
| 396 | Cu | Cr | 0.77 | 0.13 |
| 397 | Cu | Cr | 0.333 | 0.15 |
| 398 | Cu | Cr | 0.375 | 0.15 |
| 399 | Cu | Cr | 0.475 | 0.15 |
| 400 | Cu | Cr | 0.5 | 0.15 |
| 401 | Cu | Cr | 0.55 | 0.15 |
| 402 | Cu | Cr | 0.65 | 0.15 |
| 403 | Cu | Cr | 0.7 | 0.15 |
| 404 | Cu | Cr | 0.75 | 0.15 |
| 405 | Cu | Cr | 0.77 | 0.15 |
| 406 | Cu | Cr | 0.333 | 0.20 |
| 407 | Cu | Cr | 0.375 | 0.20 |
| 408 | Cu | Cr | 0.475 | 0.20 |
| 409 | Cu | Cr | 0.5 | 0.20 |
| 410 | Cu | Cr | 0.55 | 0.20 |
| 411 | Cu | Cr | 0.65 | 0.20 |
| 412 | Cu | Cr | 0.7 | 0.20 |
| 413 | Cu | Cr | 0.75 | 0.20 |
| 414 | Cu | Cr | 0.77 | 0.20 |
| 415 | Cu | Cr | 0.333 | 0.25 |
| 416 | Cu | Cr | 0.375 | 0.25 |
| 417 | Cu | Cr | 0.475 | 0.25 |
| 418 | Cu | Cr | 0.5 | 0.25 |
| 419 | Cu | Cr | 0.55 | 0.25 |
| 420 | Cu | Cr | 0.65 | 0.25 |
| 421 | Cu | Cr | 0.7 | 0.25 |
| 422 | Cu | Cr | 0.75 | 0.25 |
| 423 | Cu | Cr | 0.77 | 0.23 |
| 424 | Cu | Cr | 0.333 | 0.333 |
| 425 | Cu | Cr | 0.375 | 0.333 |
| 426 | Cu | Cr | 0.475 | 0.333 |
| 427 | Cu | Cr | 0.5 | 0.333 |
| 428 | Cu | Cr | 0.55 | 0.333 |
| 429 | Cu | Cr | 0.65 | 0.333 |
| 430 | Cu | Cr | 0.7 | 0.10 |
| 431 | Cu | Cr | 0.75 | 0.10 |
| 432 | Cu | Cr | 0.77 | 0.10 |

Table 2:

Table 2 consists of 432 compounds of the formula $Ni_bM1_cM2_d(O)_x(OH)_y$ where $y=2-x$ and $d=1-b-c$ and $x=0.13$, wherein the values of the variables M1, M2, b and c are listed in Table 1.

Table 3:

Table 3 consists of 432 compounds of the formula $Ni_bM1_cM2_d(O)_x(OH)_y$ where $y=2-x$ and $d=1-b-c$ and $x=0.15$, wherein the values of the variables M1, M2, b and c are listed in Table 1.

Table 4:

Table 4 consists of 432 compounds of the formula $Ni_bM1_cM2_d(O)_x(OH)_y$ where $y=2-x$ and $d=1-b-c$ and $x=0.17$, wherein the values of the variables M1, M2, b and c are listed in Table 1.

Table 5:

Table 5 consists of 432 compounds of the formula $Ni_bM1_cM2_d(O)_x(OH)_y$ where $y=2-x$ and $d=1-b-c$ and $x=0.21$, wherein the values of the variables M1, M2, b and c are listed in Table 1.

Table 6:

Table 6 consists of 432 compounds of the formula $Ni_bM1_cM2_d(O)_x(OH)_y$, where $y=2-x$ and $d=1-b-c$ and $x=0.22$, wherein the values of the variables M1, M2, b and c are listed in Table 1.

Table 7:

Table 7 consists of 432 compounds of the formula $Ni_bM1_cM2_d(O)_x(OH)_y$, where $y=2-x$ and $d=1-b-c$ and $x=0.23$, wherein the values of the variables M1, M2, b and c are listed in Table 1.

Table 8:

Table 8 consists of 432 compounds of the formula $Ni_bM1_cM2_d(O)_x(OH)_y$, where $y=2-x$ and $d=1-b-c$ and $x=0.26$, wherein the values of the variables M1, M2, b and c are listed in Table 1.

Table 9:

Table 9 consists of 432 compounds of the formula $Ni_bM1_cM2_d(O)_x(OH)_y$, where $y=2-x$ and $d=1-b-c$ and $x=0.28$, wherein the values of the variables M1, M2, b and c are listed in Table 1.

Table 10:

Table 10 consists of 432 compounds of the formula $Ni_bM1_cM2_d(O)_x(OH)_y$, where $y=2-x$ and $d=1-b-c$ and $x=0.30$, wherein the values of the variables M1, M2, b and c are listed in Table 1.

Table 11:

Table 11 consists of 432 compounds of the formula $Ni_bM1_cM2_d(O)_x(OH)_y$, where $y=2-x$ and $d=1-b-c$ and $x=0.37$, wherein the values of the variables M1, M2, b and c are listed in Table 1.

Table 12:

Table 12 consists of 432 compounds of the formula $Ni_bM1_cM2_d(O)_x(OH)_y$, where $y=2-x$ and $d=1-b-c$ and $x=0.4$, wherein the values of the variables M1, M2, b and c are listed in Table 1.

Table 13:

Table 13 consists of 432 compounds of the formula $Ni_bM1_cM2_d(O)_x(OH)_y$, where $y=2-x$ and $d=1-b-c$ and $x=0.42$, wherein the values of the variables M1, M2, b and c are listed in Table 1.

Table 14:

Table 14 consists of 432 compounds of the formula $Ni_bM1_cM2_d(O)_x(OH)_y$, where $y=2-x$ and $d=1-b-c$ and $x=0.48$, wherein the values of the variables M1, M2, b and c are listed in Table 1.

Table 15:

Table 15 consists of 432 compounds of the formula $Ni_bM1_cM2_d(O)_x(OH)_y$, where $y=2-x$ and $d=1-b-c$ and $x=0.5$, wherein the values of the variables M1, M2, b and c are listed in Table 1.

Table 16:

Table 16 consists of 432 compounds of the formula $Ni_bM1_cM2_d(O)_x(OH)_y$, where $y=2-x$ and $d=1-b-c$ and $x=0.6$, wherein the values of the variables M1, M2, b and c are listed in Table 1.

Table 17:

Table 17 consists of 432 compounds of the formula $Ni_bM1_cM2_d(O)_x(OH)_y$, where $y=2-x$ and $d=1-b-c$ and $x=0.69$, wherein the values of the variables M1, M2, b and c are listed in Table 1.

The chemical compounds according to the invention are partly oxidized mixed metal hydroxides, later also called precursor(s).

The parameters x and y stated in the partly oxidized mixed metal hydroxides according to the invention unambiguously define the average degree of oxidation over all the metallic components of the mixed metal hydroxide. It has now been found that the partly oxidized mixed metal hydroxides having an average degree of oxidation of from 2.1 to 2.8 can be processed particularly readily to end products of the general formula $Li_aNi_bM1_cM2_d(O)_2$ wherein M1 denotes at least one element chosen from the group consisting of Fe, Co, Mg, Zn, Cu and mixtures thereof and/or M2 denotes at least one element of the group consisting of Mn, Al, B, Ca, Cr, the index a is $0.95<=a<=1.15$, in particular a is $0.98<=a<=1.10$, the indices b, c and d are defined above, which have a considerably better cycle stability, improved charging/ischarging properties in the lithium secondary batteries and a higher tap density and particularly good sieving properties. These compounds of the general formula $Li_aNi_bM1_cM2_d(O)_2$ are also called end product in the following.

The average degree of oxidation is also an indicator for evaluation of the quality of the precursor for lithium secondary batteries. Precise adjustment of this parameter during the preparation process is therefore necessary.

It has been found, surprisingly, that the average degree of oxidation of the partly oxidized mixed metal hydroxide according to the invention should not be below a certain level in order to ensure good further processability and finally a good quality of the end product. It has also been found that the average degree of oxidation should not be too high, since a secondary phase, such as a gamma-oxyhydroxide, may increasingly occur in the precursor at degrees of oxidation which are too high. The presence of the gamma phase alongside the desired beta phase means an inhomogeneity of the precursor and finally also influences the homogeneity of the end product obtainable therefrom. Due to the interlaminar extension of the crystal lattice compared with the beta phase, the existence of a gamma phase furthermore promotes the undesirable inclusion of ionic impurities.

Preferably, the average degree of oxidation is 2.2 to 2.7, particularly preferably 2.3 to 2.6.

The determination of the average degree of oxidation over all the metallic components is based on the Rupp method of manganese dioxide determination.

The degree of oxidation determined by means of the method mentioned is the basis for evaluation of the empirical formula of the present chemical compound.

The following quantitative relationship exists between the index x and the degree of oxidation $\alpha$:

$$\alpha = x + 2$$

This means e.g. that in the case of an average oxidation level over all the metals of +2.5, a value of $(2.5-2)=0.5$ results for the index x, which leads to an empirical formula such as, for example, $NiCoMn(O)_{0.5}(OH)_{1.5}$.

Figure 1:
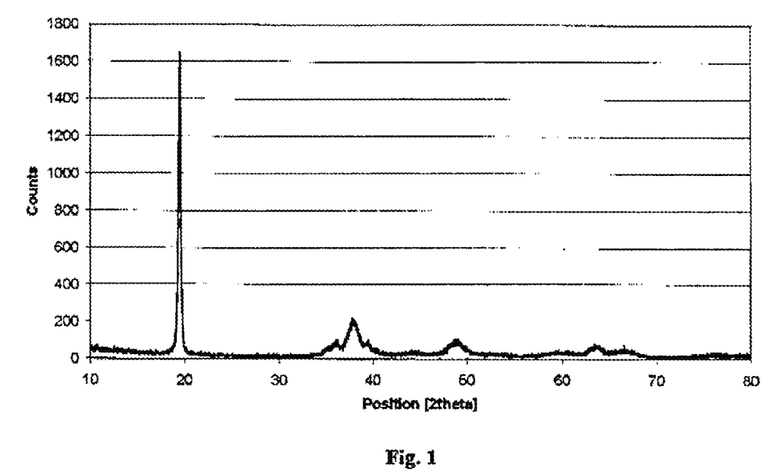
FIG. 1: X-ray diffraction spectrum (XDS) of a partly oxidized mixed metal hydroxide according to the invention, which was prepared according to Example 1.

The partly oxidized mixed metal hydroxides according to the invention are distinguished in particular in that these contain no gamma-oxyhydroxide structures. FIG. 1 shows by way of example an x-ray diffraction spectrum (XDS) of a partly oxidized mixed metal hydroxide according to the invention, which was prepared according to Example 1 and in which no gamma phase is detectable.

Preferred partly oxidized mixed metal hydroxides according to the invention contain no alpha phase.

The presence of the alpha phase alongside the desired beta phase means an inhomogeneity of the precursor and finally also influences the homogeneity of the end product obtainable therefrom.

It was furthermore to be found that as the degree of oxidation increases, e.g. when the latter reaches a value of e.g. 3.0 in the oxidized mixed metal hydroxide, the ionic impurities, those such as e.g. sodium, in the product increase, since in the phase conversion to the gamma-oxyhydroxide greater distances between layers in the crystal lattice render possible the incorporation of undesirable foreign ions. The gamma phase leads to a considerable expansion in volume due to an interlaminar extension and thereby promotes the embedding of foreign ions.

The partly oxidized mixed metal hydroxides according to the invention are also distinguished in that they have low sodium contents. Preferably, they contain <2,000 ppm, particularly preferably <1,000 ppm of sodium, in particular <500 ppm of sodium.

The partly oxidized mixed metal hydroxides according to the invention are preferably in powder form, the average particle size of the secondary particles, measured in accordance with ASTM B822, preferably being 2 to 30 µm, particularly preferably 3 to 15 µm. Secondary particles are understood as meaning particles which are composed of primary particles.

A particular feature of the mixed metal hydroxide powder according to the invention is its high tap density, which has a direct influence directly on the tap density of the end product, e.g. a lithium mixed metal oxide. The high tap density is necessary in order to achieve a high volumetric energy density in the battery. Preferably, the partly oxidized mixed metal hydroxide powders according to the invention have a tap density, determined in accordance with ASTM B527, of greater than 1.7 g/cm³, particularly preferably greater than 1.9 g/cm³.

The pulverulent mixed metal hydroxides according to the invention can be prepared both in a spherical and in a regular (non-spherical) particle shape.

The preferred powders according to the invention are distinguished in particular by the spherical shape of the powder particles, the shape factor of which has a value of greater than 0.7, particularly preferably of greater than 0.9.

The shape factor of the secondary particles can be determined by the method mentioned in U.S. Pat. No. 5,476,530, columns 7 and 8 and FIG. 5. This method determines a shape factor of the particles which is a measure of the sphericity of the particles. The shape factor of the particles can be determined from the SEM photographs of the materials.

The shape factor is determined by evaluation of the particle circumference and the particle area and of the determination of the diameter deduced from the particular parameters. The diameters mentioned result from $$d_U = U/\pi \quad d_A = (4A/\pi)^{1/2}.$$

The shape factor of the particles f is deduced from the particle circumference U and the particle area A according to:

$$f = \left(\frac{d_A}{d_U}\right) = \left(\frac{4\pi A}{U^2}\right).$$

In the case of an ideal spherical particle, $d_A$ and $d_U$ are equal and a shape factor of precisely one would result.

Figure 2:
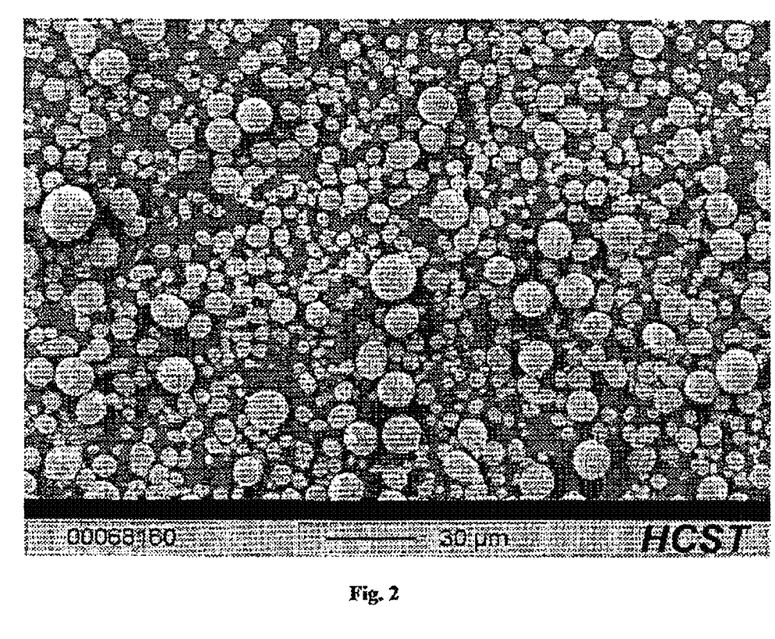
FIG. 2: Photograph of the partly oxidized mixed metal hydroxide powder according to the invention prepared according to Example 1 taken with a scanning electron microscope (SEM).

FIG. 2 shows by way of example a photograph of the partly oxidized mixed metal hydroxide powder according to the invention prepared according to Example 1 taken with a scanning electron microscope (SEM).

The partly oxidized mixed metal hydroxide powders according to the invention have a standardized width of the particle size distribution, defined according to the formula $$\frac{D90 - D10}{D50}$$

wherein D denotes the diameter of the powder particles, of less than 1.8, particularly preferably of less than 1.2.

The invention furthermore relates to an efficient and economical process for the preparation of the partly oxidized mixed metal hydroxides according to the invention.

The invention therefore also provides a process for the preparation of the partly oxidized mixed metal hydroxides according to the invention comprising the following steps:

co-precipitation of spherical mixed metal hydroxides from corresponding metal salt solutions, partial oxidation of the precipitation product (mixed metal hydroxide) using an oxidizing agent, separating off of the co-precipitated partly oxidized mixed metal hydroxide from the suspension, washing and drying of the partly oxidized mixed metal hydroxide The partly oxidized mixed metal hydroxides according to the invention can be prepared both in a spherical and in a non-spherical particle shape, the preparation of the former being carried out in the presence of ammonia or ammonium salts.

Mixed hydroxides are prepared by precipitation from aqueous metal salt solutions by adjusting the pH to 8-14, particularly preferably to 9-13, by addition of alkali hydroxide solutions. The process can be carried out discontinuously or continuously. In the continuous process, metal salt solution and the alkali hydroxide solution are added simultaneously to a precipitating reactor, with continuous removal of the product suspension. Suitable metal salts are water-soluble metal salts, e.g. sulfates, nitrates, halides, such as e.g. chlorides or fluorides. Alkali metal salt solutions which are employed for carrying out the precipitation are hydroxides of the alkali metals, preferably sodium hydroxide, as well as ammonium hydroxide.

An oxidation of the metals should be avoided during the precipitation process, in order to be able to achieve a high tap density of the partly oxidized mixed metal hydroxide. The oxidation is therefore carried out after the precipitation in a further reactor.

In order to be able to synthesize the partly oxidized mixed metal hydroxides according to the invention with an increased degree of oxidation on a commercial scale, the invention provides a process which is particularly suitable in respect of simple ease of integration into the existing production process. In this process, the partial oxidation of the co-precipitated mixed metal hydroxide can still take place in the product suspension. The process is realized by transferring the product suspension with the co-precipitated mixed metal hydroxide from the precipitating reactor into a subsequent stirred tank. An oxidizing agent is fed into this tank via an inlet tube. Air, oxygen, hydrogen peroxide, sodium peroxydisulfate, potassium peroxydisulfate and/or mixtures thereof are particularly suitable oxidizing agents.

Preferably, the reaction temperature of the suspension during the partial oxidation is 25 to 65° C., particularly preferably 30 to 60° C.

The pH of the suspension during the partial oxidation of the mixed metal hydroxide is preferably 7-13, particularly preferably 8-12.

The dwell time of the product suspension in the reaction tank likewise plays an important role during the partial oxidation. It has now been found that the dwell time of from 1 to 10 hours, preferably of from 2 to 8 hours and particularly preferably of from 4 to 6 hours leads to partly oxidized mixed metal hydroxides according to the invention.

After the oxidation step, the partly oxidized mixed metal hydroxide is removed continuously. However, it is also possible to remove the product in portions. The partly oxidized mixed metal hydroxide according to the invention is then washed on a suction filter and dried in a drying cabinet.

The preparation of partly oxidized mixed metal hydroxides according to the invention can also be carried out via another process by separating off the co-precipitated mixed metal hydroxides from the suspension, washing them and drying them under an oxygen-containing atmosphere, such as e.g. air.

The invention therefore provides a further process comprising the following steps:
- co-precipitation of spherical mixed metal hydroxides from corresponding metal salt solutions,
- separating off of the co-precipitated mixed metal hydroxide from the suspension,
- washing of the mixed metal hydroxide,
- drying and simultaneous partial oxidation of the mixed metal hydroxide under an oxygen-containing atmosphere at a temperature of greater than 80° C. for at least 3 hours.

The partly oxidized mixed metal hydroxides according to the invention are particularly suitable for the synthesis of end products having the chemical formula $Li_aNi_bM1_cM2_d(O)_2$, also called end product, which are employed as the active material for positive electrodes in secondary batteries. The partly oxidized mixed metal hydroxides according to the invention are conceived such that the end product obtainable therefrom—lithium mixed metal oxide—can be prepared via a simple synthesis route.

The invention furthermore provides a process for the preparation of active materials for secondary batteries comprising the following steps:
- mixing of a chemical compound with a lithium-containing component,
- calcining and sieving of the mixture.

In this process, the chemical reaction of the precursor proceeds to a chemical compound $Li_aNi_bM1_cM2_d(O)_2$, wherein M1 is at least one element chosen from the group consisting of Fe, Co, Mg, Zn, Cu and mixtures thereof and/or M2 is at least one element chosen from the group consisting of Mn, Al, B, Ca, Cr and mixtures thereof, the particle shape and/or particle size distribution being retained.

The end product can be prepared by mixing the partly oxidized mixed metal hydroxide according to the invention with a lithium-containing component and then calcining and sieving the mixture. Suitable lithium-containing components are, in particular, lithium hydroxide, lithium carbonate, lithium nitrate and/or mixtures thereof. The calcining can be carried out at temperatures of greater than 600° C., preferably of greater than 700° C.

The end product obtainable from the partly oxidized mixed metal hydroxide according to the invention is distinguished in particular by very good sieving properties. The sieving yield of the end product is greater than 90%, preferably greater than 95%, particularly preferably greater than 98%.

The partly oxidized mixed metal hydroxides according to the invention are preferably employed as a precursor for cathode active material in lithium secondary batteries, together with materials known to the person skilled in the art.

The invention is explained in more detail with the aid of the following examples.

The average degrees of oxidation stated in the following examples are determined by the Rupp method. This method is based on the method of determination of manganese dioxide. In this, metal ions of higher valency (valency +3 or +4 in this case) are reduced to metal(II) ions by iodide, the iodide being oxidized to elemental iodine. The iodine formed is determined by means of titration against sodium thiosulfate standard solution. The equivalent point is indicated with starch solution.

0.2 g of the test material is weighed into a 500 ml conical flask with a ground glass joint on an analytical balance. 50 ml of potassium iodide solution and 25 ml of dilute sulfuric acid are added by means of a 50 ml measuring cylinder. The conical flask is then closed with a glass stopper.

The test material is dissolved at room temperature by occasional swirling of the conical flask. The dissolving time is 30 to 60 min.

When the sample has dissolved completely, titration is carried out against sodium thiosulfate standard solution with addition of approx. 5 drops of starch solution, until the colour changes detectably from brown/blue to pale green.

To determine any interfering reactions, it is necessary to run a blank sample in parallel in the analysis operation. The consumption of sodium thiosulfate standard solution is to be included in the evaluation.

The average degree of oxidation over all the metals of the compound can be calculated via the following formula:

$$a = 2 + \frac{(V(Na_2S_2O_{3,sample}) - V(Na_2S_2O_{3,blank})) \cdot titre(Na_2S_2O_3) \cdot c(Na_2S_2O_3) \cdot M(sample)}{m(sample)}$$

EXAMPLES

Example 1

A solution which is in each case 0.7 molar in $NiSO_4$, $CoSO_4$ and $MnSO_4$ is fed continuously to a precipitating reactor. In addition to the metal-containing solutions, a 2.5 molar NaOH solution and a 12.5% strong $NH_3$ solution are simultaneously fed continuously into the reactor. These streams are metered such that an ammonia concentration of 30 g/l and a free sodium hydroxide solution concentration of 1.4 g/l are established in the stationary operating state. Under these conditions, a pH of 12.4 is established. The high pH ensures that the metallic components are precipitated as hydroxides from the metal-containing solutions. The addition of the various feed solutions results in a solids concentration in the reactor of 40 g/l. The temperature in the reactor is regulated to 50° C. by means of an external supply of heat. The average dwell time of the solid in the reactor is 6 h.

The product suspension is removed continuously from the reactor and first fed to washing on a suction filter. Washing is necessary in order to separate the solid from adhering impurities.

After washing of the hydroxide, drying for 24 h and parallel oxidation of the solid are carried out in a circulating air drying cabinet under an oxygen-containing atmosphere at 100° C.

In the compound synthesized, the metals nickel, cobalt and manganese have a molar ratio of Ni:Co:Mn=1:1:1. The solid synthesized in this way has an average oxidation level over all the metals, determined by experiment, of 2.7.

The tap density of the material was measured as 1.74 g/cm$^3$.

The SEM photograph in FIG. 2 shows the particular sphericity and also the pronounced compactness of the particles of the material synthesized in this way. The shape factor determined for the material is 0.85. For further conversion of the precursor into the end product, the precursor was first mixed mechanically with technical-grade lithium carbonate (Chemetall). The molar ratio of the lithium compound to the precursor in this case was 1.05:1.00.

The mechanical mixture was then calcined at 890° C. under an oxygen-containing atmosphere for 30 hours.

After the calcining, the material was sieved.

The sieving yield was 97.5%. 2.5% of the material could not be sieved through a 50 μm sieve. After the sieving, the material was subjected to a second calcining at 890° C. under an oxygen-containing atmosphere for 4 hours. Thereafter, sieving was carried out again with a sieving yield of 99.6%.

Figure 3:
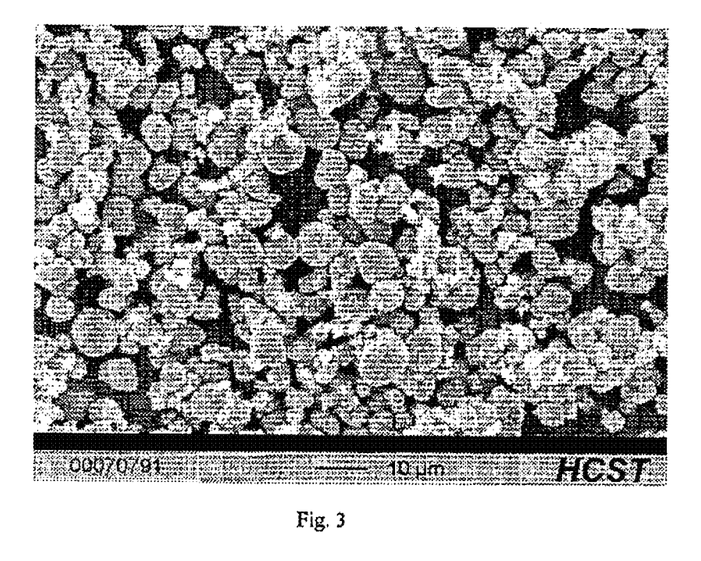
FIG. 3: SEM photograph of the end product prepared according to Example 1.
Figure 4:
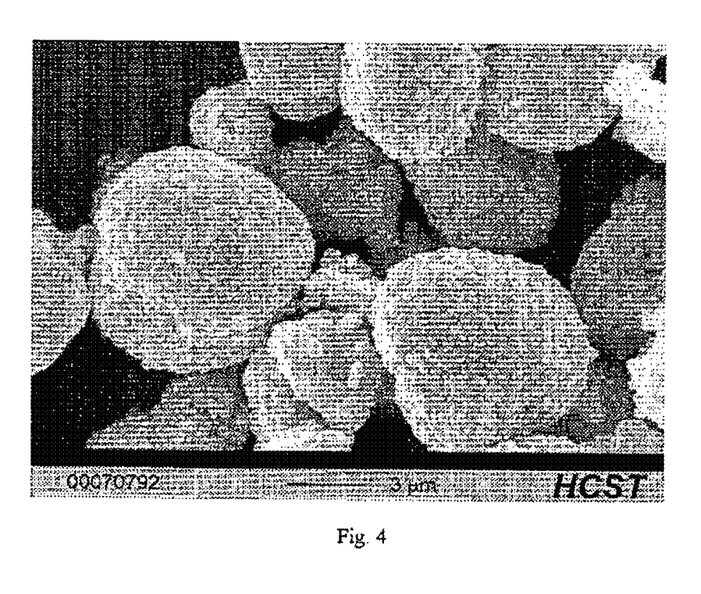
FIG. 4: SEM photograph of the end product prepared according to Example 1.

The tap density of the end product here was 2.0 g/cm$^3$. It can be seen from the SEM photographs of the end product, FIGS. 3 and 4, that the conversion of the precursor into the end product has taken place with retention of the spherical shape of the secondary particles of the precursor.

Comparison Example 1

A solution which is in each case 0.7 molar in NiSO$_4$, CoSO$_4$ and MnSO$_4$ is fed continuously to a precipitating reactor. In addition to the metal-containing solutions, a 2.5 molar NaOH solution and a 12.5% strong NH$_3$ solution are simultaneously fed continuously into the reactor. These streams are metered such that an ammonia concentration of 8.3 g/l and a free sodium hydroxide solution concentration of 0.5 g/l are established in the stationary operating state. Under these conditions, a pH of 12.0 is established. The high pH ensures that the metallic components are precipitated as hydroxides from the metal-containing solutions. The addition of the various feed solutions results in a solids concentration in the reactor of 80 g/l. The temperature in the reactor is regulated to 45° C. by means of an external supply of heat. The average dwell time of the solid in the reactor is 12 h.

The product suspension is removed continuously from the reactor and first fed to a filtration and washing. Washing is necessary in order to separate the solid from adhering impurities.

After washing of the hydroxide, the solid was dried at 70° C.

In the compound synthesized, the metals nickel, cobalt and manganese have a molar ratio of Ni:Co:Mn=1:1:1. The mixed hydroxide synthesized in this way had an average oxidation level over all the metals, determined by experiment, of 2.07.

Figure 5:
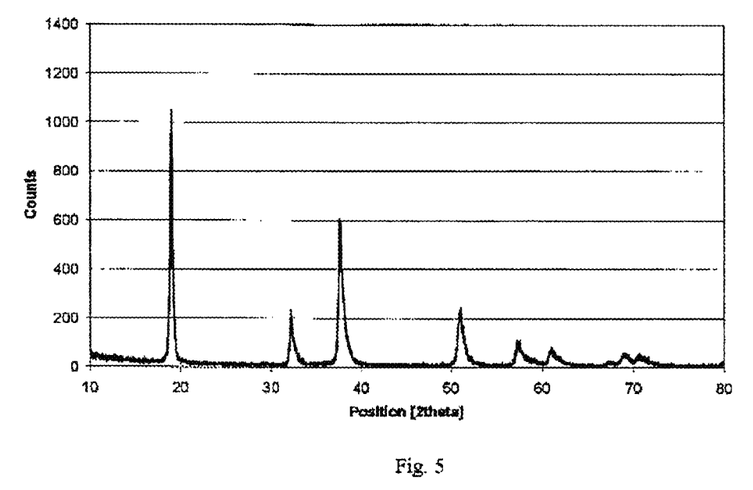
FIG. 5: XDS of a partly oxidized mixed metal hydroxide according to the invention, which was prepared according to Comparative Example 1.

The x-ray diffraction spectrum for the compound synthesized is shown in FIG. 5.

For further conversion of the precursor into the end product, the precursor was first mixed mechanically with technical-grade lithium carbonate (Chemetall). The molar ratio of the lithium compound to the mixed metal compound in this case was 1.07:1.00.

The mechanical mixture was then calcined at 860° C. under an oxygen-containing atmosphere for 30 hours.

After the calcining, the material was sieved. The sieving yield was 64%.

Figure 6:
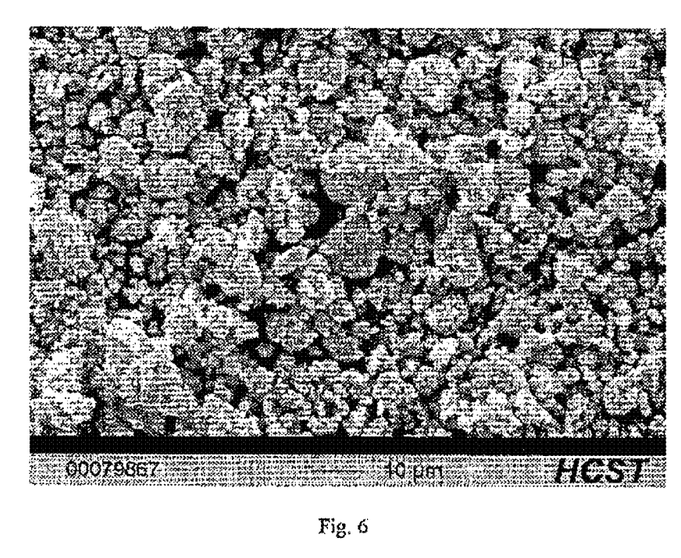
FIG. 6: SEM photograph of the end product prepared according to Comparative Example 1.
Figure 7:
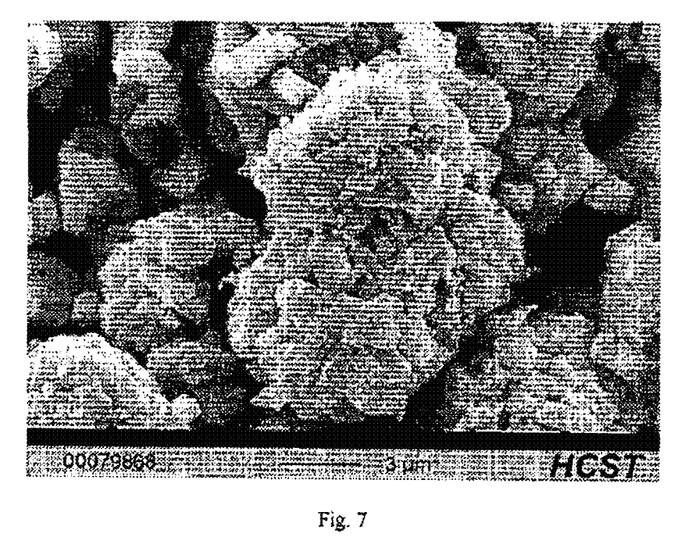
FIG. 7: SEM photograph of the end product prepared according to Comparative Example 1.

It can be seen from the SEM photographs of the end product, FIGS. 6 and 7, that during the conversion of the precursor into the end product the spherical particle shape of the precursor is lost due to the irregular growth of the primary particles.

Figure 8:
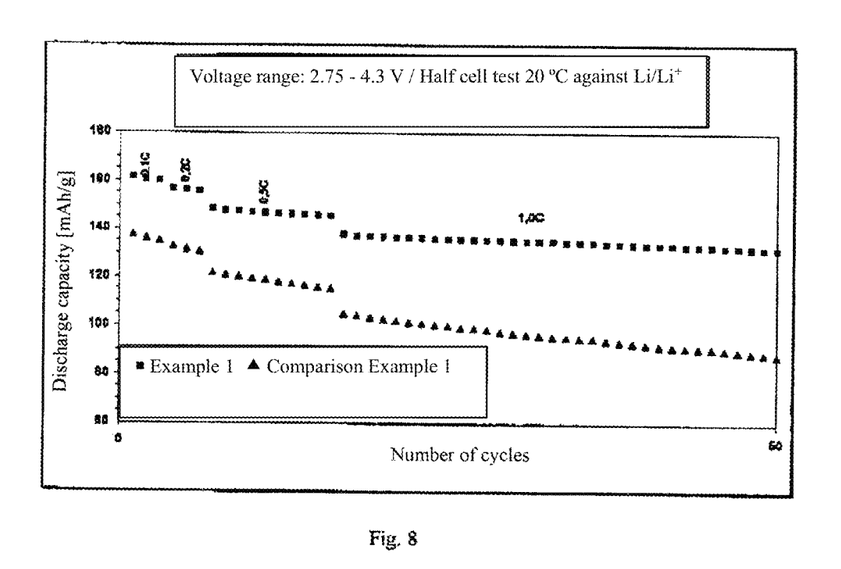
FIG. 8: Comparison of the electrochemical performance data of half cells which comprise the material synthesized according to Example 1 and that according to Comparison Example 1 as the cathode active material.

A comparison of the electrochemical performance data of half cells which comprise the material synthesized according to Example 1 and that according to Comparison Example 1 as the cathode active material is shown in FIG. 8. It can be seen from the figure that a half cell produced with the substance from Example 1 shows better performance data compared with a half cell produced with the substance from Comparison Example 1.

Example 2

A solution which is in each case 0.7 molar in NiSO$_4$, CoSO$_4$ and MnSO$_4$ is fed continuously to a precipitating reactor. A 2.5 molar NaOH solution and a 12.5% strong NH$_3$ solution are simultaneously fed continuously into the reactor. These streams are metered such that an ammonia concentration of 8 g/l and a free sodium hydroxide solution concentration of 0.5 g/l are established in the stationary operating state. Under these conditions, a pH of 12.0 is established. The high pH ensures that the metallic components are precipitated as hydroxides from the metal-containing solutions. The addition of the various feed solutions results in a solids concentration in the reactor of 50 g/l. The temperature in the reactor is regulated to 50° C. by means of an external supply of heat. The average dwell time of the solid in the reactor is 5 h.

The product suspension is fed continuously from the precipitating reactor to a second reactor, in which the pH is adjusted to 12.0 by means of pH control and metering in of 2.5 molar NaOH solution and the temperature is adjusted to 50° C. by means of an external supply of heat. The average dwell time is adjusted to 10 h. Air is introduced into this second reactor with a volume flow of 0.5 liter/min. During this procedure, the suspension changes its colour from pale brown in the first reactor to dark brown to black in the second reactor. The suspension is removed continuously from the second reactor, and initially fed to washing on a suction filter. Washing is necessary in order to separate the solid from adhering impurities. After washing of the product, the solid is dried for 24 h in a vacuum drying cabinet at 100° C.

Figure 9:
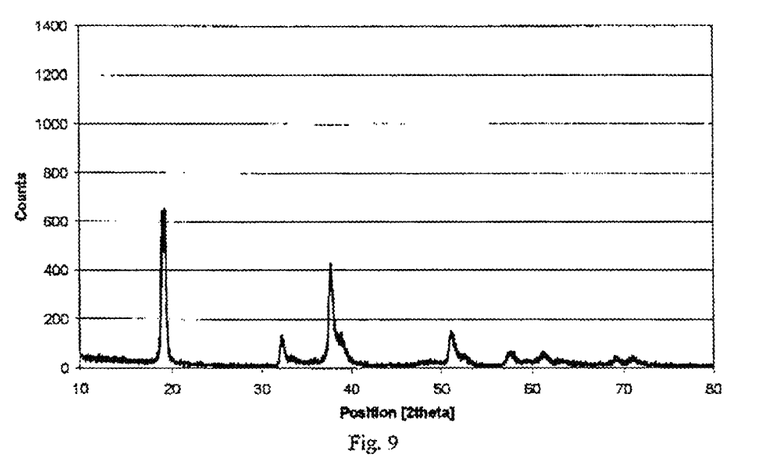
FIG. 9: XDS of a partly oxidized mixed metal hydroxide according to the invention, which was prepared according to Example 2.

In the compound synthesized, the metals nickel, cobalt and manganese have a molar ratio of Ni:Co:Mn=1:1:1. The solid synthesized in this way has an average oxidation level over all the metals, determined by experiment, of 2.39. The sodium content of the product is 70 ppm. In the XDA spectrum, FIG. 9, only peaks which can be assigned to a p structure are detected. No further phases are to be found in the XDA spectrum.

Comparison Example 2

A solution which is in each case 0.7 molar in NiSO$_4$, CoSO$_4$ and MnSO$_4$ is fed continuously to a precipitating reactor. A 2.5 molar NaOH solution and a 12.5% strong NH$_3$ solution are simultaneously fed continuously into the reactor. These streams are metered such that an ammonia concentration of 8 g/l and a free sodium hydroxide solution concentration of 0.5 g/l are established in the stationary operating state. Under these conditions, a pH of 12.0 is established. The high pH ensures that the metallic components are precipitated as hydroxides from the metal-containing solutions. The addition of the various feed solutions results in a solids concentration in the reactor of 50 g/l. The temperature in the reactor is regulated to 50° C. by means of an external supply of heat. The average dwell time of the solid in the reactor is 5 h.

The product suspension is fed continuously from the precipitating reactor to a second reactor, in which the pH is adjusted to 12.5 by means of pH control and metering in of 2.5 molar NaOH solution and the temperature is adjusted to 70° C. by means of an external supply of heat. The average dwell time is adjusted to 15 h. Air is introduced into this second reactor with a volume flow of 0.5 liter/min. During this procedure, the suspension changes its colour from pale brown in the first reactor to dark brown to black in the second reactor. The suspension is removed continuously from the second reactor, and initially fed to washing on a suction filter. Washing is necessary in order to separate the solid from adhering impurities. After washing of the product, the solid is dried for 24 h in a vacuum drying cabinet at 100° C.

Figure 10:
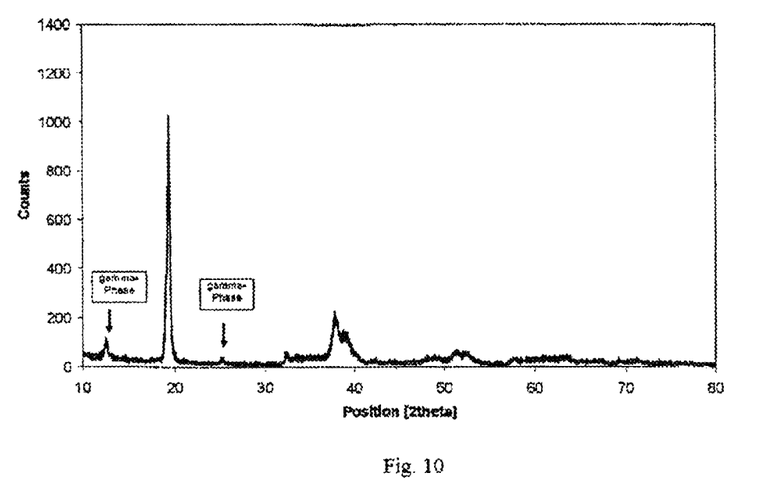
FIG. 10: XDS of a partly oxidized mixed metal hydroxide according to the invention, which was prepared according to Comparative Example 2.

In the compound synthesized, the metals nickel, cobalt and manganese have a molar ratio of Ni:Co:Mn=1:1:1. The solid synthesized in this way has an average oxidation level over all the metals, determined by experiment, of 2.83. The sodium content of the product is 3,000 ppm. In the XDA spectrum, FIG. 10, contents of a gamma phase are detected, in addition to the peaks, which can be assigned to a beta structure.

Further examples of the partial oxidation of the mixed metal compounds in suspension are shown in the following Table 18:

TABLE 18

| pH | Temperature ° C. | Dwell time h | Oxidizing agent | Degree of oxidation |
|---|---|---|---|---|
| 11.5 | 50 | 8 | air | 2.33 |
| 12.0 | 50 | 8 | air | 2.37 |
| 12.0 | 60 | 8 | air | 2.61 |
| 12.5 | 60 | 8 | air | 2.69 |
| 12.5 | 60 | 5 | air | 2.43 |
| 12.8 | 60 | 8 | air | 2.67 |
| 12.5 | 60 | 5 | oxygen | 2.47 |
| 12 | 50 | 2 | $H_2O_2$ | 2.36 |
| 12 | 60 | 2 | $H_2O_2$ | 2.54 |

The invention claimed is:

1. A method of making a powder comprising a partly oxidized mixed metal hydroxide as a precursor for the preparation of cathode material for lithium secondary batteries, the partly oxidized mixed metal hydroxide being a homogeneous product represented by the formula $Ni_bM1_cM2_d(O)_x(OH)_y$ wherein
M1 denotes only one element selected from the group consisting of Co and Mg,
M2 denotes only one element selected from the group consisting of Mn, B, and Cr,
b≤0.65
c≤0.5
d≤0.5, and
x is a number between 0.1 and 0.54,
y is a number between 1.46 and 1.9, and x+y=2, which has an average degree of oxidation of 2.1 to 2.54, and wherein the partly oxidized mixed metal hydroxide further contains sodium, and a content of sodium in the partly oxidized mixed metal hydroxide is less than 2,000 ppm, and wherein the powder has a standardized width of a particle size distribution, defined according to formula (1), is less than 1.8

$(D90-D10)/D50$     (1), wherein D denotes a diameter of the powder particles, and wherein the powder has an average particle size, measured in accordance with ASTM B 822, of 2-30 μm the method comprising the following steps:
a. co-precipitating spherical mixed metal hydroxides from corresponding metal salt solutions,
b. separating off the co-precipitated mixed metal hydroxide from the suspension,
c. washing the mixed metal hydroxide,
d. drying and simultaneously partially oxidizing the mixed metal hydroxide under an oxygen-containing atmosphere at a temperature of greater than 80° C. for at least 3 hours.

2. The method according to claim 1 further comprising partially oxidizing the co-precipitated mixed metal hydroxides using an oxidizing agent before separating off the co-precipitated partly oxidized mixed metal hydroxide from the suspension.

3. The method according to claim 1, wherein the powder comprising the mixed metal hydroxide contains no gamma-oxyhydroxide structures.

4. The method according to claim 1, wherein the powder comprising the mixed metal hydroxide contains no alpha-hydroxide structures.

5. The method according to claim 1, wherein the content of sodium in the partly oxidized mixed metal hydroxide is less than 1,000 ppm.

6. The method according to claim 1, having a tap density, measured in accordance with ASTM B 527, of greater than 1.7 g/cm$^3$.

7. The method according to claim 1, wherein the powder comprising the mixed metal hydroxide has a tap density, measured in accordance with ASTM B 527, of greater than 1.9 g/cm$^3$.

8. The method according to claim 1, wherein the powder comprising the mixed metal hydroxide has an average particle size, measured in accordance with ASTM B 822, of 3-15 μm.

9. The method according to claim 1, wherein the powder comprising the mixed metal hydroxide comprise spherical particles.

10. The method according to claim 1, wherein the powder comprising the mixed metal hydroxide comprise particles having a shape factor of greater than 0.7.

11. The method according to claim 1, wherein the powder comprising the mixed metal hydroxide comprise particles having a shape factor of greater than 0.9.

12. The method according to claim 1, wherein the standardized width of the particle size distribution, defined according to formula (1), is less than 1.2

$(D90-D10)/D50$     (1), wherein D denotes the diameter of the powder particles.

13. The method according to claim 1, wherein M1 is Co and M2 is Mn.

14. The method according to claim 1, wherein the metal salt is a sulfate and the co-precipitation is conducted by addition of alkalihydroxide solution.

15. The method according to claim 1, wherein step d comprises drying and simultaneously partially oxidizing the mixed metal hydroxide under an oxygen-containing atmosphere at a temperature of greater than 80° C. for 3 to 24 hours.

* * * * *